US009251717B2

(12) United States Patent
LoStracco et al.

(10) Patent No.: US 9,251,717 B2
(45) Date of Patent: Feb. 2, 2016

(54) AUGMENTATIVE AND ALTERNATIVE COMMUNICATION LANGUAGE SYSTEM

(71) Applicants: Heidi LoStracco, Bensalem, PA (US); Renee Collender, Marlton, NJ (US)

(72) Inventors: Heidi LoStracco, Bensalem, PA (US); Renee Collender, Marlton, NJ (US)

(*) Notice: Subject to any disclaimer, the term of this patent is extended or adjusted under 35 U.S.C. 154(b) by 192 days.

(21) Appl. No.: 13/674,490

(22) Filed: Nov. 12, 2012

(65) Prior Publication Data

US 2013/0065204 A1 Mar. 14, 2013

Related U.S. Application Data

(63) Continuation-in-part of application No. 13/459,050, filed on Apr. 27, 2012.

(60) Provisional application No. 61/479,532, filed on Apr. 27, 2011.

(51) Int. Cl.

| | |
|---|---|
| ***G09B 19/00*** | (2006.01) |
| ***G06F 3/023*** | (2006.01) |
| ***G09B 5/06*** | (2006.01) |
| ***G09B 21/00*** | (2006.01) |

(52) U.S. Cl.

CPC .............. *G09B 19/00* (2013.01); *G06F 3/0237* (2013.01); *G09B 5/06* (2013.01); *G09B 21/00* (2013.01)

(58) Field of Classification Search

CPC ..................................................... G06F 3/0237

USPC .......................................... 434/156; 715/780

See application file for complete search history.

(56) References Cited

U.S. PATENT DOCUMENTS

| | | | | |
|---|---|---|---|---|
| 4,661,916 | A * | 4/1987 | Baker et al. | 704/260 |
| 5,748,177 | A * | 5/1998 | Baker et al. | 345/172 |
| 5,920,303 | A | 7/1999 | Baker et al. | |
| 2008/0183460 | A1* | 7/2008 | Baker et al. | 704/3 |
| 2010/0225599 | A1* | 9/2010 | Danielsson et al. | 345/173 |
| 2011/0173558 | A1* | 7/2011 | Yeh et al. | 715/773 |

* cited by examiner

*Primary Examiner* — Sam Yao
*Assistant Examiner* — Thomas Hong
(74) *Attorney, Agent, or Firm* — Fox Rothschild LLP

(57) ABSTRACT

A method and device for providing a language system. The method includes displaying a home screen including a first plurality of user selectable communication keys, wherein each communication key represents a first word. In response to receiving a first indication of a user selection of a first key, it is determined whether the first key is linked to a secondary screen. If the first key is not linked to a secondary screen, an audible signal representing the first word is output. Otherwise, a secondary screen is displayed including a second plurality of communication keys that are related to the first word and a communication key that represents the first word. The device includes appropriate hardware for performing the method. In both the method and device, the language system is configured to output an audible output of a user selected word after no more than two user selections.

22 Claims, 15 Drawing Sheets

300

AUGMENTATIVE AND ALTERNATIVE COMMUNICATION LANGUAGE SYSTEM

RELATED APPLICATIONS

This application is a continuation-in-part of, and hereby claims priority under 35 U.S.C. §120 to, U.S. patent application Ser. No. 13/459,050 filed Apr. 27, 2012 and entitled "AUGMENTATIVE AND ALTERNATIVE COMMUNICATION (AAC) LANGUAGE SYSTEM," the disclosure of which is incorporated herein by reference. U.S. patent application Ser. No. 13/459,050 claims priority under 35 U.S.C. §119 to U.S. Provisional Patent Application 61/479,532 filed Apr. 27, 2011 and entitled "AUGMENTATIVE AND ALTERNATIVE COMMUNICATION (AAC) LANGUAGE SYSTEM," the disclosure of which is also incorporated herein by reference.

BACKGROUND

The present disclosure relates to a visual teaching aid. More specifically, the present disclosure relates to an augmentative and alternative communication (AAC) language system, Some individuals exhibit difficulty with communicating with their voice. This can occur for various reasons. For example, an autistic child may have difficulty regularly communicating with his or her teachers and parents. Similarly, nonverbal individuals may have difficulty communicating with others who are not properly educated in nonverbal communication methods such as sign language.

Autistic children, as well as children with similar learning disorders, are often instructed using a specialized curriculum. This curriculum may include behavior modification techniques such as practicing a physical activity, practicing social interactions, practicing verbal communication, and other activities. However, this teaching is rarely directed toward a single student, as the time and resources required for individual instruction are generally lacking.

Various devices and systems have been developed to assist individuals with communication issues. For example, specialized computing devices are available that can help an individual verbalize his or her words. Similarly, specialized computing devices are available to help children with communication development issues practice and improve their speech. However, these specialized computing devices generally have a high cost and limited functionality, limiting the amount of customization that a teacher or other instructor can do with the device, and limiting the overall learning experience for the child. For example, these devices typically have a confusing user interface and organizational system, making it difficult for a child with a developmental issue to grasp and readily understand the device, and to use without issue or constant instruction from a teacher or instructor.

This document describes a language system and process intended to address at least some of the issues described above, and/or other issues.

SUMMARY

In one general respect, the embodiments disclose a method of providing an augmentative and alternative communication (AAC) language system. The method includes displaying a home screen, the home screen comprising a first plurality of user selectable communication keys, wherein each communication key represents a first word; receiving a first indication of a user selection of a first key from the first plurality of user selectable keys, wherein the first key is located at a first position on the display; in response to receiving the first indication, determining whether the first key is linked to a secondary screen; if the first key is not linked to a secondary screen, outputting an audible signal representing the first word; and if the first key is linked to a secondary screen, displaying the secondary screen, the secondary screen comprising a second plurality of communication keys that are related to the first word, wherein the secondary screen further comprises a communication key that represents the first word. The AAC language system is further configured to output an audible output of a user selected word after no more than two user selections.

In another general respect, the embodiments disclose a device for providing an augmentative and alternative communication (AAC) language system. The device includes a processor, a touch-sensitive display operably connected to the processor, and a computer readable medium operably connected to the processor. The computer readable medium includes a set of instructions configured to instruct the processor to display a home screen on the touch-sensitive display, the home screen comprising a first plurality of user selectable communication keys, wherein each communication key represents a first word; receive, from the touch-sensitive display, a first indication of a user selection of a first key selected from the first plurality of user selectable communication keys, wherein the first key is located in a first position on the display; in response to receiving the first indication, determine whether the first key is linked to a secondary screen; if the first key is not linked to a secondary screen, output an audible signal representing the first word; and if the first key is linked to a secondary screen, display the secondary screen on the touch-sensitive display, the secondary screen comprising a second plurality of communication keys that are related to the first word. The AAC language system is further configured to output an audible output of a user selected word after no more than two user selections.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "portable computing device" refers to a mobile device that includes a processor and a tangible, computer-readable memory. The memory may contain programming instructions in the form of a software application that, when executed by the processor, causes the device to perform one or more processing operations according to the programming instructions. A typical portable computing device includes a touch sensitive screen, such as a resistive touchscreen, capacitive touchscreen, or infrared touchscreen. Examples of suitable devices include portable electronic devices such as tablet devices, smartphones, and the like.

Augmentative and alternative communication (AAC) techniques encompass communication methods used to supplement or replace speech or writing for those with impairments in the production or comprehension of spoken or written language. AAC techniques such as those described in this document may be used by individuals with a wide range of speech and language impairments, including congenital impairments such as cerebral palsy, intellectual impairment and autism, and acquired conditions such as amyotrophic lateral sclerosis and Parkinson's disease. AAC techniques may be a permanent addition to a person's communication, or a temporary aid used in education or during rehabilitation.

Figure 1:
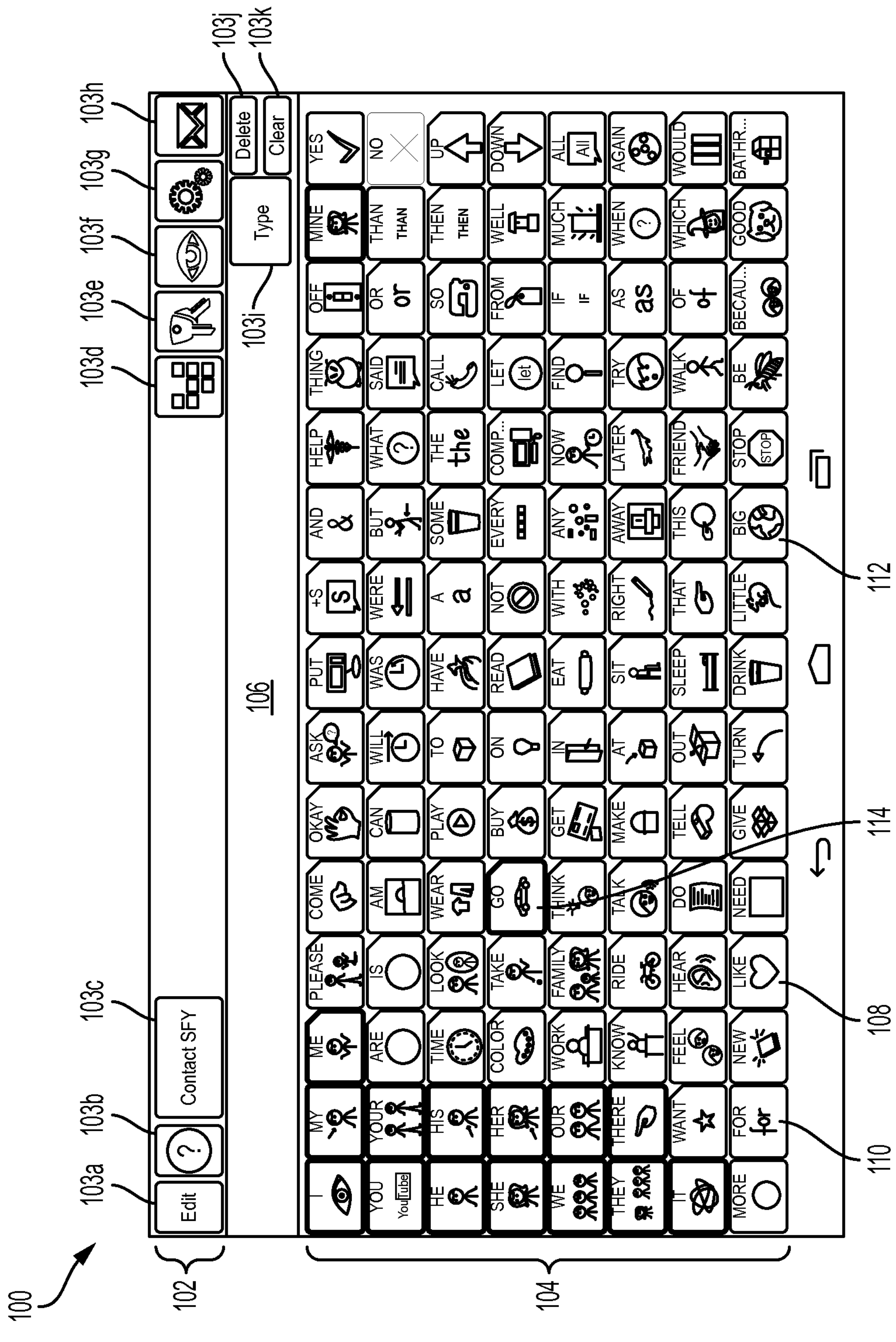
FIG. 1 depicts a screenshot of a home screen of an augmentative and alternative communication (AAC) language system according to an embodiment.

The present disclosure is directed to an AAC language system implemented on, for example, a portable computing device. The language system may include one or more specialized software modules configured to provide a user with a communication interface. FIG. 1 illustrates a screenshot of an example of home screen 100, i.e., a primary screen that serves as the first screen of the user interface and the primary screen from which a user may initiate a communication. The home screen 100 may include multiple user interactive areas arranged therein. For example, the home screen 100 may include one or more toolbars 102, or other command or menu interface, and a keyboard 104 comprising a grid of communication keys. As used herein, a "button" or a "key" refers to an element of a user interface that a user may touch or otherwise manipulate to initiate a specific command or to provide a specific input.

The toolbar 102 may include various configurations of buttons related to operational features of the communication interface. For example, the toolbar 102 may include selectable configuration buttons related to features such as an edit button 103*a*, a word finder button 103*b* and a contact button 103*c*. The toolbar 102 may further include selectable configuration buttons related to features such as open/close word button 103*d*, lock button 103*e*, view button 103*f*, settings button 103*g*, and message button 103*h*. Several of the selectable configuration buttons are described in greater detail in regard to the other figures contained herein.

The toolbar 102, or another section of the home screen 100, may also include a selectable text entry button 103*i* that allows a user of the language system to type one or more words into a text bar 106. The toolbar 102 may also include a delete button 103*j* button for deleting a word from the text bar 106, as well as a clear button 103*k* for clearing the entire text bar 106.

The keyboard 104 may include a group of communication keys. Each communication key includes an icon that represents a specific word and has a unique location within the home screen 100. On the home screen 100, the icon may include only the word, or a word along with an image to help the user remember the word. For example, key 108 represents the word "Like." As shown in FIG. 1, key 108 includes an image of a heart.

The words represented by the keys contained within the keyboard 104 may define a set of core words. Studies have shown that about 80% of the words a person says are chosen from a set of 300-500 core words. A subset of the most popular core words may be stored in a data structure within the device's memory when the communication interface is first presented to a user. The subset of core words may be static and not changeable by a user of the communication interface. Alternatively, one or more users, such as a teacher or other administrator, may have administrator rights to alter or add words to the subset of core words. The administrator may be able to enter and/or change the image that is displayed on each word's icon. Words added by the administrator may be stored in the data structure in the device's memory, along with any related image data, for inclusion in the word's keyboard icon.

The core word keys may be arranged in the keyboard 104 according to a predetermined pattern, such as by parts of speech or by parts of a sentence. The pattern may follow the flow of a sentence from left to right in a subject-predicate sequence, or a subject-verb-object sequence. For example, subjects and pronouns such as he, she, it, I, we, etc., may be arranged on a left side of the keyboard 104. Verbs or actions words may be arranged in a center area of the keyboard 104. Predicates and objects may be arranged at a right side area of the keyboard 104. By following this arrangement, the keyboard 104 progresses from left to right in a typical sentence structure.

In some embodiments, the color of an icon's background, font, or other element may further distinguish parts of speech or sentence parts. For example, keys representing parts of a sentence subject may exhibit a first color, while keys representing a sentence's predicate may exhibit a different color. In some embodiments, certain words, such as highly used words like "Go" or "Mine," may exhibit even additional colors so as to distinguish the highly used words from the other words represented in the keyboard 104.

A set of the buttons in the keyboard 104 may be configured that, upon selection of any home screen key by a user, the language system progresses to a secondary screen. Home screen keys that, when selected, will cause the language system to display a secondary screen may exhibit a graphic element to make them appear different than those keys that are not linked to a secondary screen. For example, as shown in key 108, a corner of the key icon may appear to be folded down, indicating there is additional information "behind" the key that, when selected, will be displayed. Alternatively, for any key having no additional information (i.e., each key not linked to a secondary screen), the key may appear without the graphic element. For example, key 110 does not include the folded corner image.

When a user selects a key from the keyboard 104, if the word is part of an ontology, the language system may display a secondary screen containing that word along with additional words that form the ontology. For example, if a user selects key 112 labeled "Big," the language system may display secondary screen 200 showing a set of words that form an ontology with the selected word "Big." The ontology may include different tenses or other forms of the selected word, as well as words that may follow the selected word in a sentence.

On the secondary screen 200, key 202 labeled "Big" is in an identical position as key 112 was on the home screen 100. The keys directly adjacent the selected key, in this example key 202, may contain words that are semantically related to the selected key. For example, the keys immediately above key 202 for the adjective "Big" represent progressively increasing superlative forms of the adjective, here "Bigger" and "Biggest." Similarly, the key to the right of key 202 "Big" represents the synonym "Large." Words may be positioned adjacent to one another, and in an order, based upon comparative meaning. For example, keys may show superlative status in a hierarchal order with the key labeled "Biggest" being on top of the key labeled "Bigger," which is on top of the key 202 labeled "Big."

Additionally, the keys showing the word that was selected on the home screen 100, and various tenses, synonyms and superlatives of the selected word, may have no images, and only words, so as to stand out from the other keys when displayed on the secondary screen 200. When viewing the secondary screen 200, selecting any of the keys shown therein will result in the device producing an audible output of the selected word being spoken via an audio output device. For example, if the user selects key 202, the device will output a voice saying "Big." Similarly, if the user selects any other word shown in secondary screen 200, the language system will output an audible output of the word being spoken. By selecting a key on the secondary screen 200, the language system will return to the home screen 100 after the audible output. The user may also select a home key 204 that returns the language system to the home screen 100 without an audible output.

Figure 2:
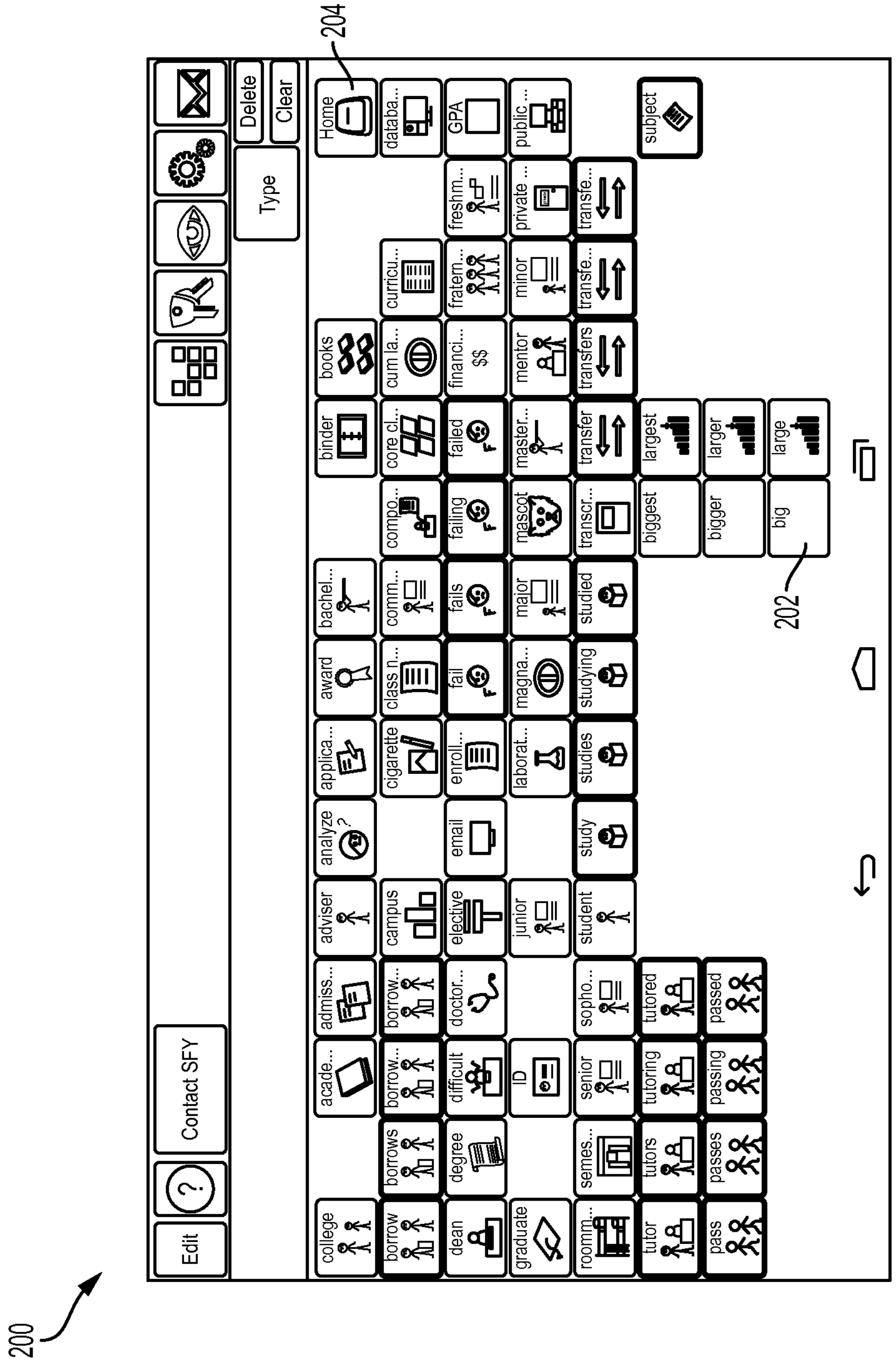
FIG. 2 depicts a screenshot of a secondary screen of the AAC language system according to an embodiment.
Figure 3:
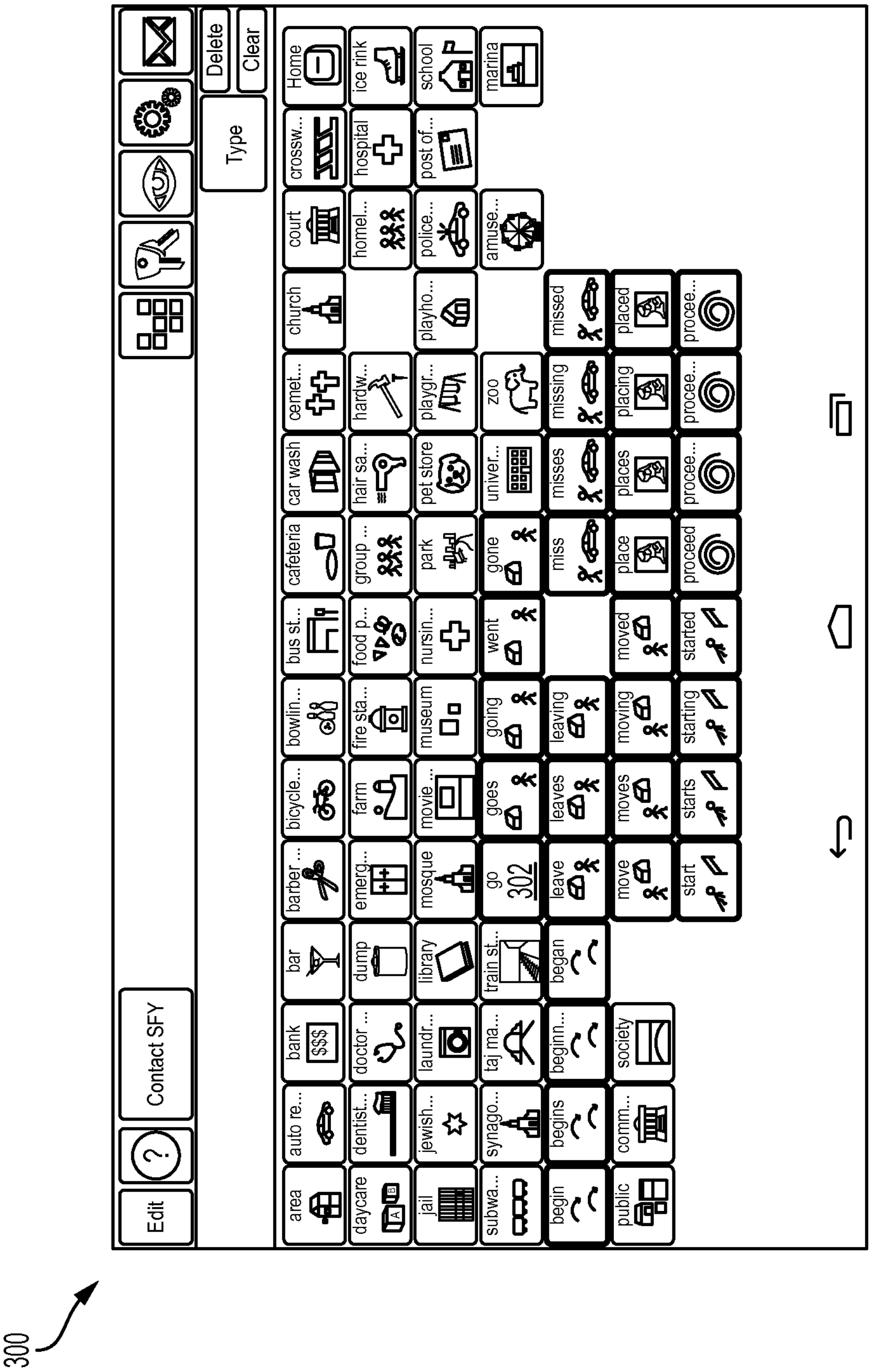
FIG. 3 depicts a screenshot of an alternative secondary screen of the AAC language system according to an embodiment.

If, for example, a user selects key 114 labeled "Go," from the home screen 100 as shown in FIG. 1, the language system may display secondary screen 300 as shown in FIG. 3, showing words contained within the ontology related to the word "Go." As before with FIG. 2, in FIG. 3 secondary screen key 302 labeled "Go" is in the same position on secondary screen 300 as key 114 "Go" was on the home screen 100. This same positioning teaches and reinforces a repetitive set of motor skills that remains unchanged throughout the use of the language system. For example, each time a user wants to select the word "Go", the user would first select key 114 from the home screen 100, and key 302 in the same position on the secondary screen 300. Once the user has this motion memorized, they can quickly select "Go" again from muscle memory.

Thus, the user can always achieve an audible output of a desired word with no more than two touches of the user interface. The first user input will occur through the home screen. If the selected word is not linked to an ontology, the language system may cause an audio output device to "speak," or generate an audible output of, the selected word. If the selected key's word is part of an ontology, the language system will display a secondary screen that includes the ontology. When the user selects a key on the secondary screen, the system will speak the key's associated word and then always return to the home screen.

As shown in FIG. 3, the keys near to key 302 (i.e., including at least one adjacent key and a sequence of one or more semantically related keys) represent various tenses and conjugations of the verb "Go." Immediately to the right of key 302, the keys represent "Goes," "Going," "Went," and "Gone." As before in FIG. 2, the language system does not display an image on these keys such that those keys the other keys as shown on secondary screen 300.

The arrangement of icons and keys as taught herein results in a language system where any word the user wishes to select is at most two selections away, a first selection from the home screen, and a second selection from the secondary screen.

Figure 4:
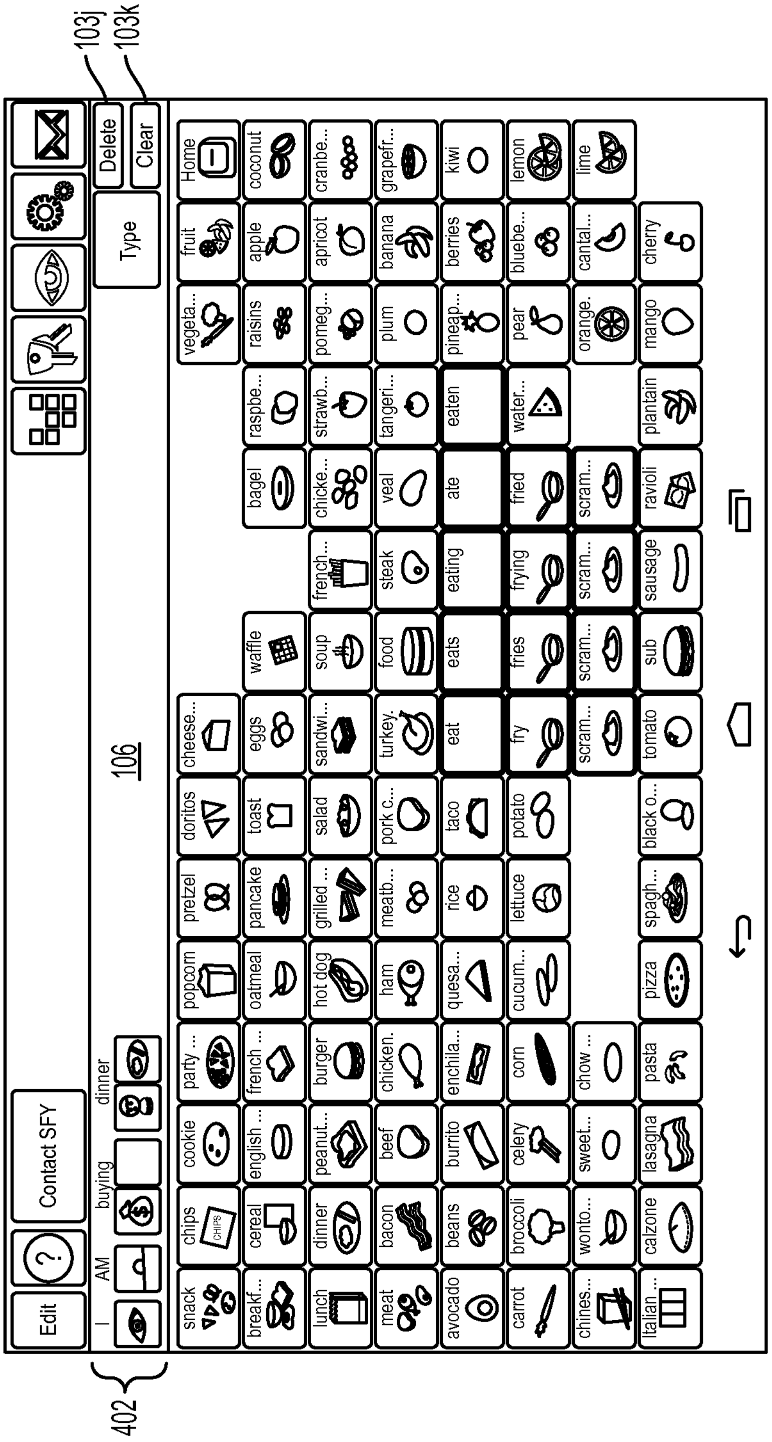
FIG. 4 depicts a screenshot showing sentence construction using the AAC language system according to an embodiment.

A user of the language system may use the communication interface to build a sentence and communicate directly with others. For example, as shown in FIG. 4, the word associated with each key selected by a user may be displayed in text bar 106. For example, as shown in FIG. 4, the language system may construct the sentence 402 "I am buying dinner" based upon a user selecting each of the individual words from the user interface. As the user selects each word from the home screen or a secondary screen, the selected word is added to the text bar 106. The user may show the sentence 402 to another person, thereby communicating directly with the other person via the language system. Additionally, the language system may be configured to audibly read the sentence in response to a user selection. For example, the user may select the text bar 106, or a word contained within the sentence 402, and the language system may audibly read the sentence. The user of the language system may opt to delete an individual word form the sentence 402 by selecting the delete key 103j, or clear the sentence by selecting clear key 103k. Optionally, the language system may speak the entire sentence in response to a user selection of a system command key or other input.

Figure 5:
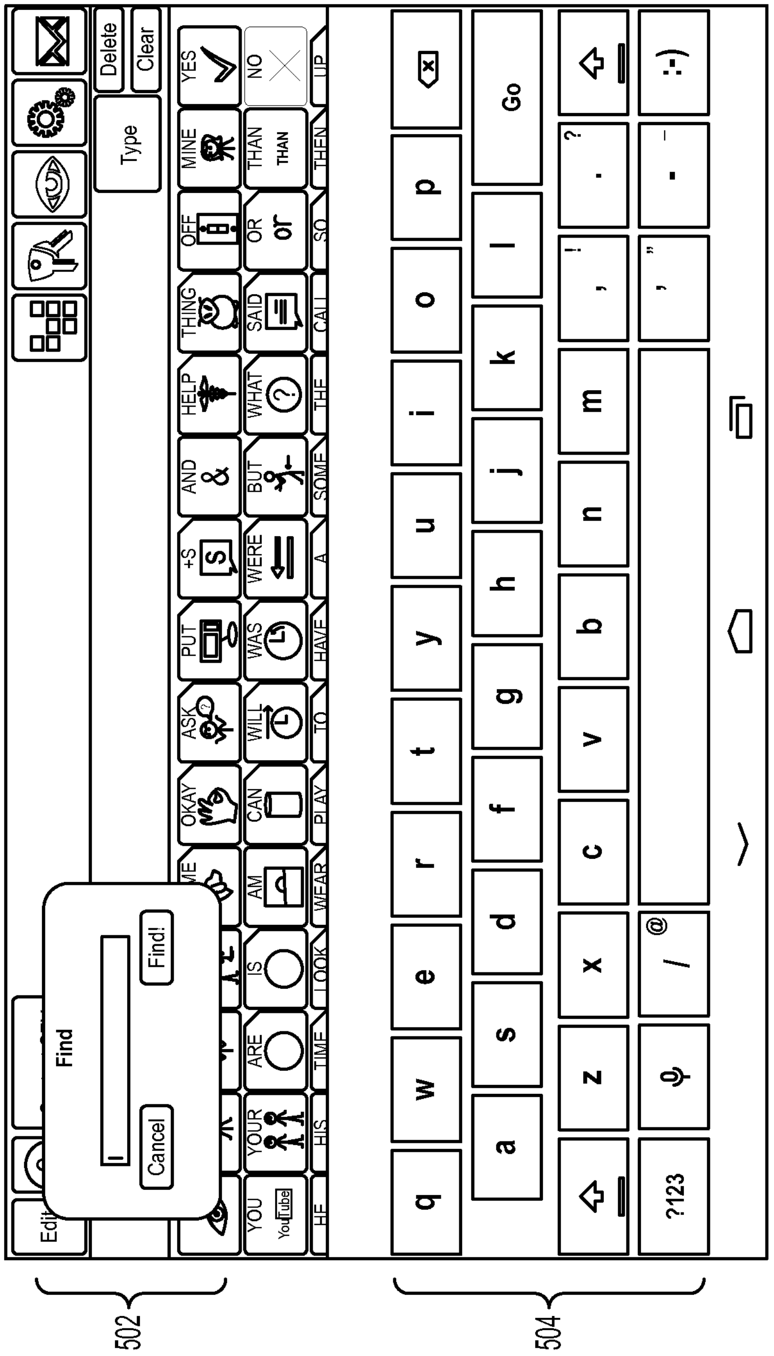
FIG. 5 depicts a screenshot of a search option incorporated into the AAC language system according to an embodiment.

FIG. 5 illustrates an example of a word search option provided by the language system. By selecting the word finder key 103*b* on home screen 100 (as shown, for example, in FIG. 1), a user may be able to search for a word. The language system may display a search query box 502 to the user along with a keyboard 504, providing the user with a means to manually type in a word. Alternatively or additionally, the user may enter the word by speaking the word into a microphone or other audio capture device. The language system may perform a voice recognition procedure, and identify the word the user is searching for. The language system may then search for the word and, if the word already exists in the language system, display the location of the word to the user, visually showing the user how to find the word in the language system.

If the word the user is searching for is located on the home screen, the language system may use an animation or other visual cue to identify the searched-for word. For example, the language system may cause the appropriate key on the home screen to flash. If the user searches for a word located on a secondary screen, the language system may identify a first word the user should select on the home screen and where on the appropriate secondary screen the user may find the word they are searching for. When switching between screens and displaying the location of the first word and the searched-for word to the user, the language system may use animation to further teach the user how to find the word. The language system may cause an appropriate key from the keyboard 104 to flash on the home screen 100, and, after a user selects the appropriate key, or a predetermined amount of time passes, the language system may switch to the secondary screen and flash the appropriate key on the related secondary screen that is associated with the searched-for word. In an embodiment, all other keys may be shaded, blacked out, or otherwise obscured such that the flashing keys on the main screen and the secondary screen are the only visible keys. When viewing the secondary screen, the first key that the user would select to get to the displayed secondary screen may be left visible so as to reinforce in the user where that key is positioned.

Figure 6:
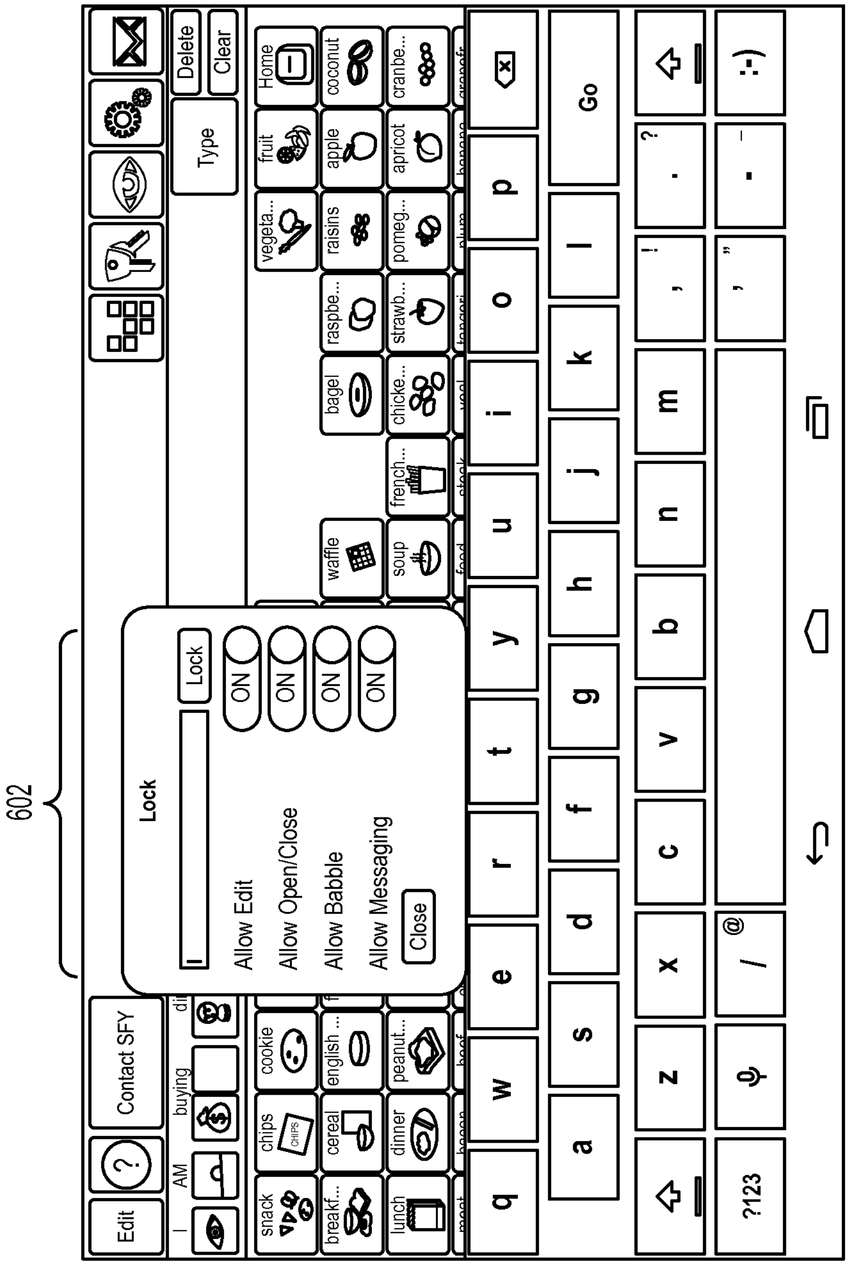
FIG. 6 depicts a screenshot of a lock option incorporated into the AAC language system according to an embodiment.

By selecting the lock key 103*e* from the home screen, an administrator may be able to selectively set access to various functions for an individual user. For example, as shown in FIG. 6, the language system may display a lock screen 602 to the administrator in response to the administrator selecting the lock key 103*e*, where the administrator may turn on or off various functions for an individual user. In order to prevent non-credentialed users from accessing the lock screen 602, the administrator may be prompted to provide a secure login and password pair when accessing the language system.

Figure 7A:
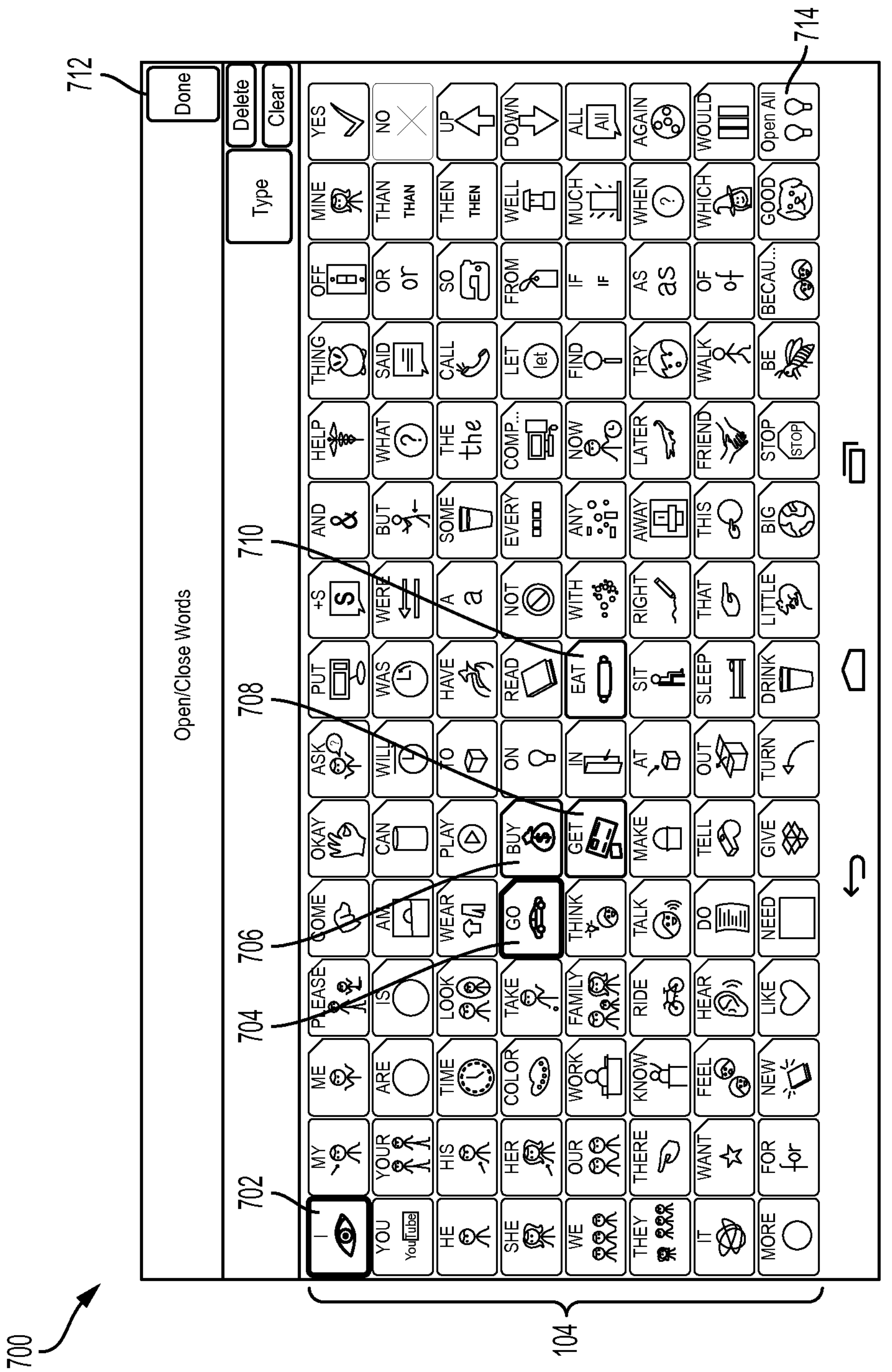
FIGS. 7A and 7B depict an open and close word feature incorporated into the AAC language system according to an embodiment.

An administrator may further have the option to open and close words such that only a subset of the total available words is shown to a user of the language system. In response to a selection of the open and close key 103d from the home screen 100, the language system may display a modified home screen 700 as shown in FIG. 7A. In the modified home screen 700, the language system may dim each of the keys in the keyboard 104 unless selected by the administrator. As shown in FIG. 7A, the administrator has selected keys 702, 704, 706, 708 and 710. Thus, the language system displays those selected keys in their original, undimmed appearance. Once the administrator has selected the keys they want undimmed, they may select the done key 712. If the administrator wishes to open all the keys during the selection process, they may select an open all key 714.

Figure 7B:
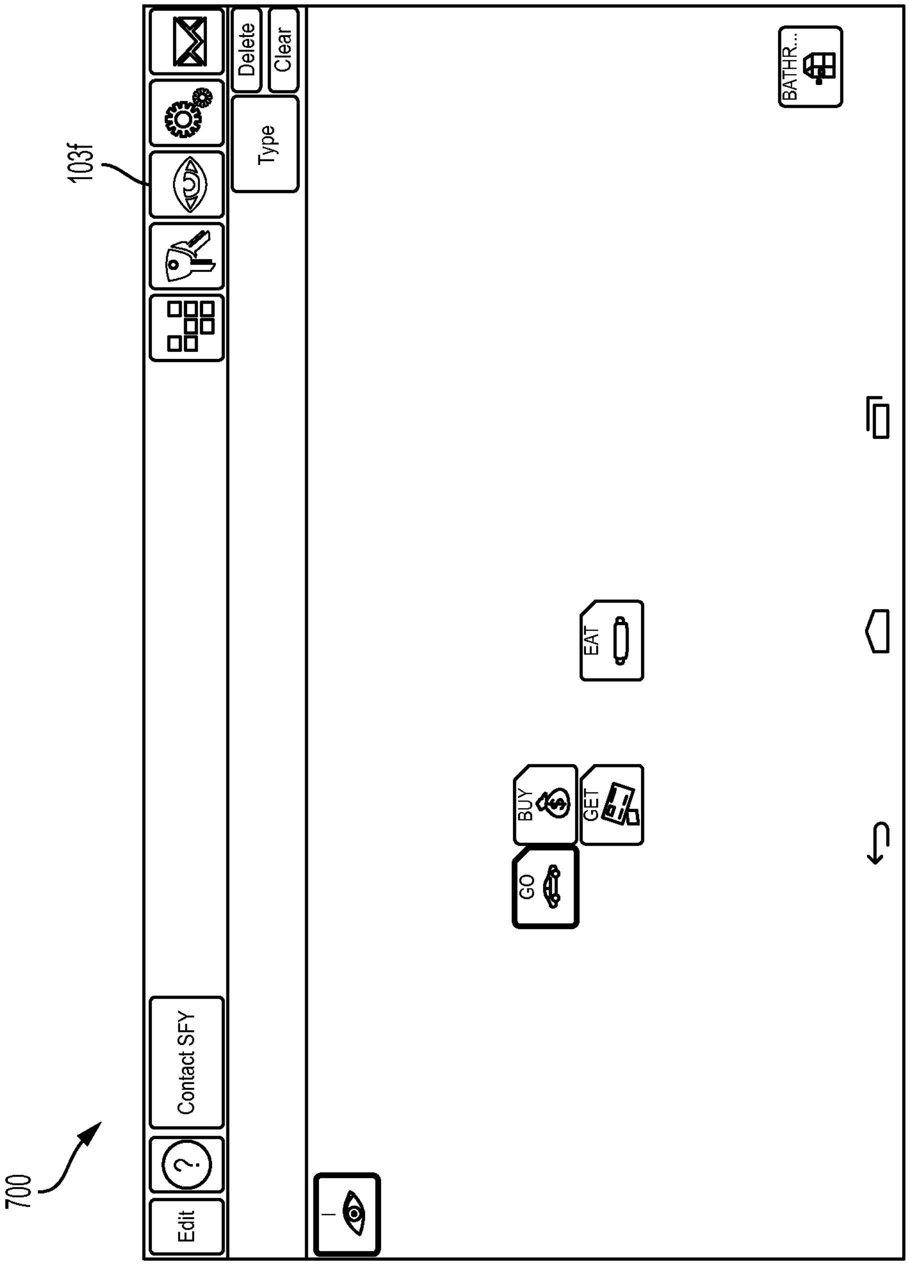

As shown in FIG. 7B, upon selecting the done key 712, the language system may display the modified home screen 700. which is black except for those keys selected by the administrator. To return to the full home screen, the user may select the view key 103*f*. In response to the administrator selecting the view key 103*f*, the language system may display the original home screen 100.

By allowing an administrator to select a subset of keys to be displayed to a user of the language system, the language system may be less overwhelming to a new user. As the user becomes familiar with the language system, the administrator may open more keys. As the position of the keys remains unchanged, the user can simply build onto what they have already learned without worrying about relearning any of the prior information.

It should also be noted that the open and close process as shown in FIGS. 7A and 7B is shown on the home screen only by way of example. The open and close process may be applied to each secondary screen as well.

Figure 8A:
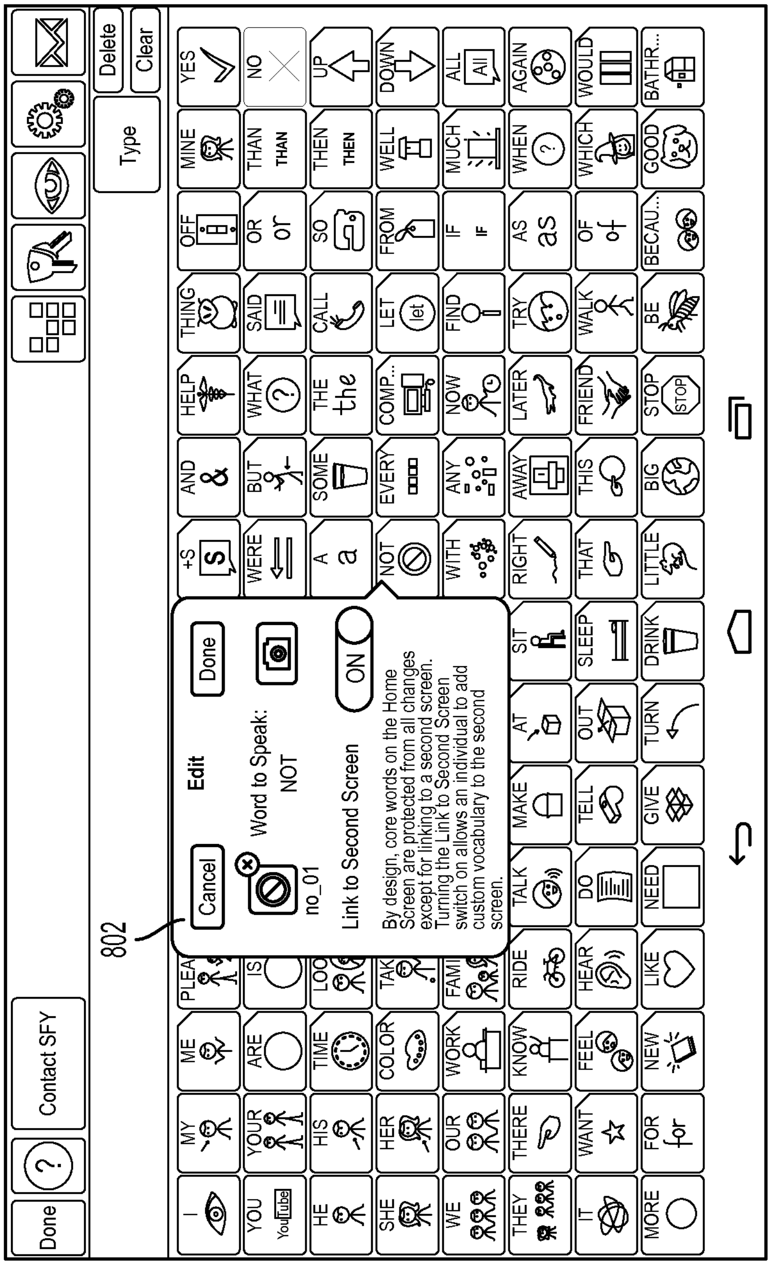
FIGS. 8A-8D depict an editing feature incorporated into the AAC language system according to an embodiment.

An administrator may further have the option to edit the language system. For example, the administrator may select the edit key 103*a*. In response to the administrator selecting the edit key 103*a*, the language system may enter an editing mode. In editing mode, the administrator may opt to edit an existing key, add a new key, or delete an existing key. If the administrator opts to edit an existing key, the language system may display an edit window similar to window 802 as shown in FIG. 8A. This provides the administrator with an interface to edit the selected key, as well as editing the function of the selected key.

For example, as shown in window 802, the administrator may see and change information related to the appearance and function of an individual key. The window 802 may show the picture associated with the key, along with the filename of the image. In this example, the filename of the image is "no_01." The window 802 may also include an indication of what word will be spoken upon selection of the key from either the home page (if the key is not linked to a secondary page), or the associated secondary page. If the administrator wants to change the image associated with the word, or if the word does not already have an image, the administrator may select a camera icon to capture an image using, for example, a built in camera integrated into the device running the language system. The window 802 may also provide the administrator with the option to link the key to a secondary screen. When the administrator selects this for the first time, the language system may produce a new secondary page that the administrator can populate with additional keys. Once a secondary page exists, turning off the linking option may merely disable the link function, while the language system maintains the data related to the secondary page. Then, if the administrator opts to link again to the second page, the secondary page retains the same keys as before. As discussed above, core words as shown on the home screen may be locked and protected from change.

Figure 8B:
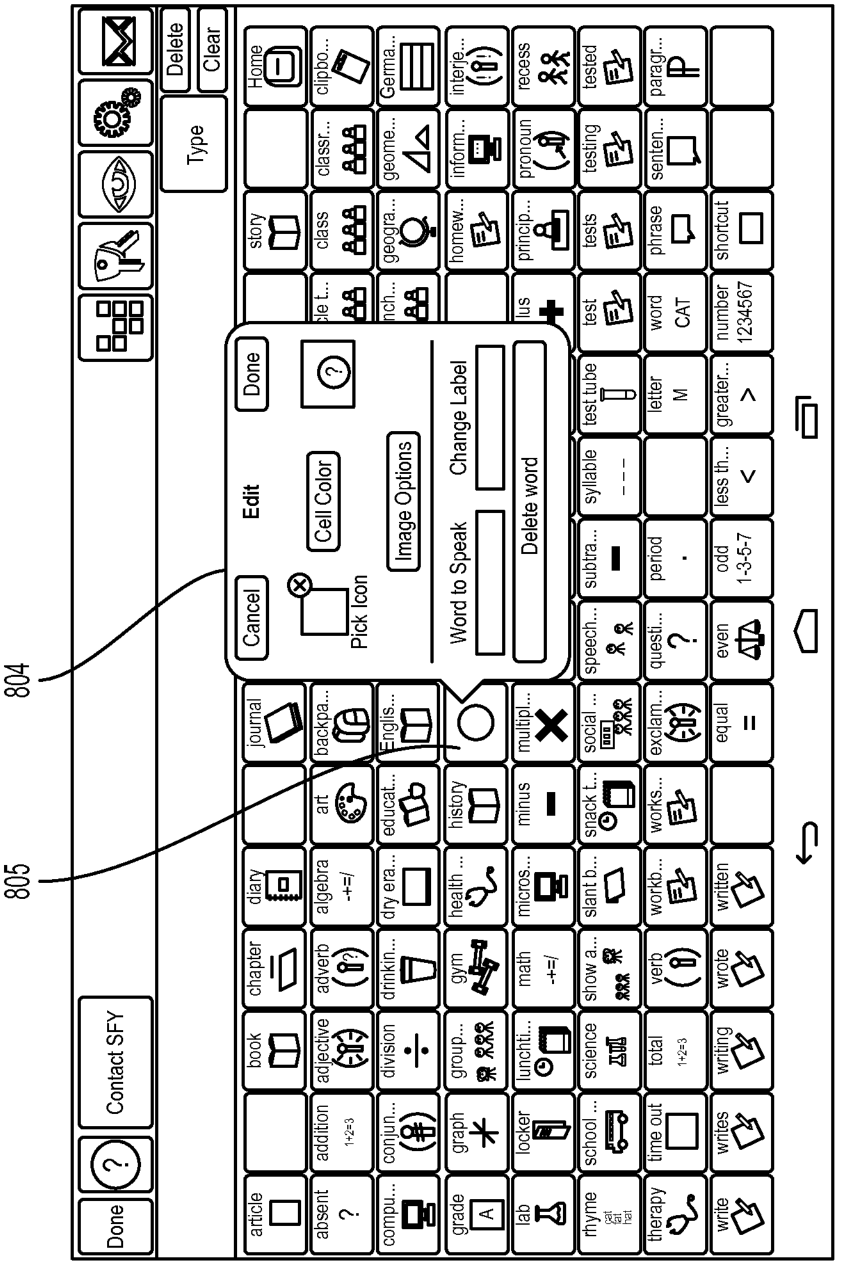

If, on a secondary screen, the administrator opts to add a new word, the language system may display a window similar to window 804 as is shown in FIG. 8B. To add a new word, the administrator may select the edit key 103*a* (as shown, for example, in FIG. 1), and then select a blank space, e.g., blank space 805, on the keyboard. The administrator may have the option of entering the word to speak, entering the label of the key to add, changing the color of the key, and adding an image. For example, as shown in window 804, the administrator may have the option to select an icon to include as an image associated with the new word. Similar to editing a key, the administrator may select an existing file or capture a new image for the newly added word. The administrator may also select the cell color for the key, select various image options, enter the word to speak, and enter the label of the key that will be displayed for the new word. When entering the word to speak, the language system may include a text-to-speech converter that reads the typed word, converts the typed word to speech, saves an audible file of the word being spoken, and associates the saved audible file with the key for output upon selection of the key by a user of the language system.

Figure 8C:
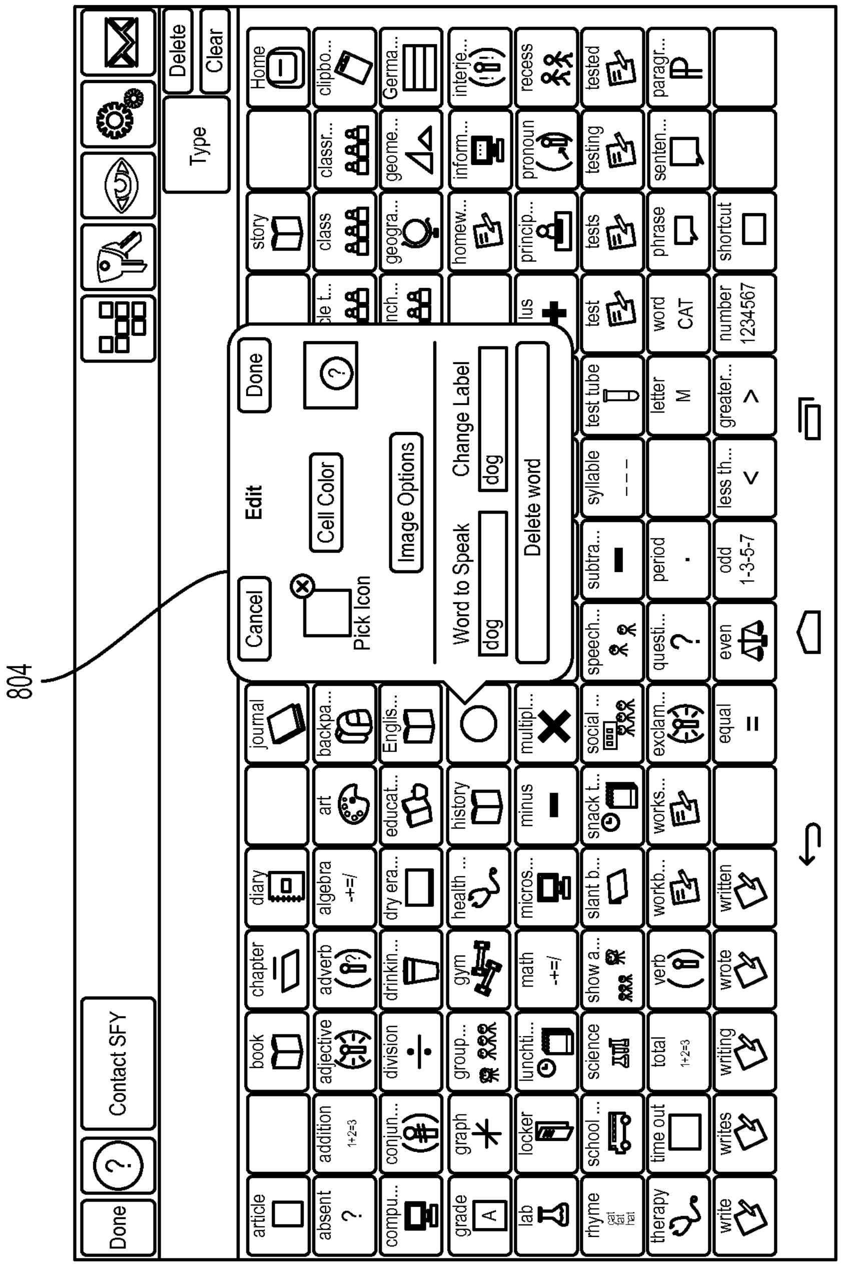

For example, as shown in FIG. 8C, the administrator may enter "Dog" as both the word to speak and the label of the new key. It should be noted that the same word is shown entered in the word to speak field as well as the label field by way of example only. The words entered in the word to speak field and the label field may be different words depending upon the new word being added.

Figure 8D:
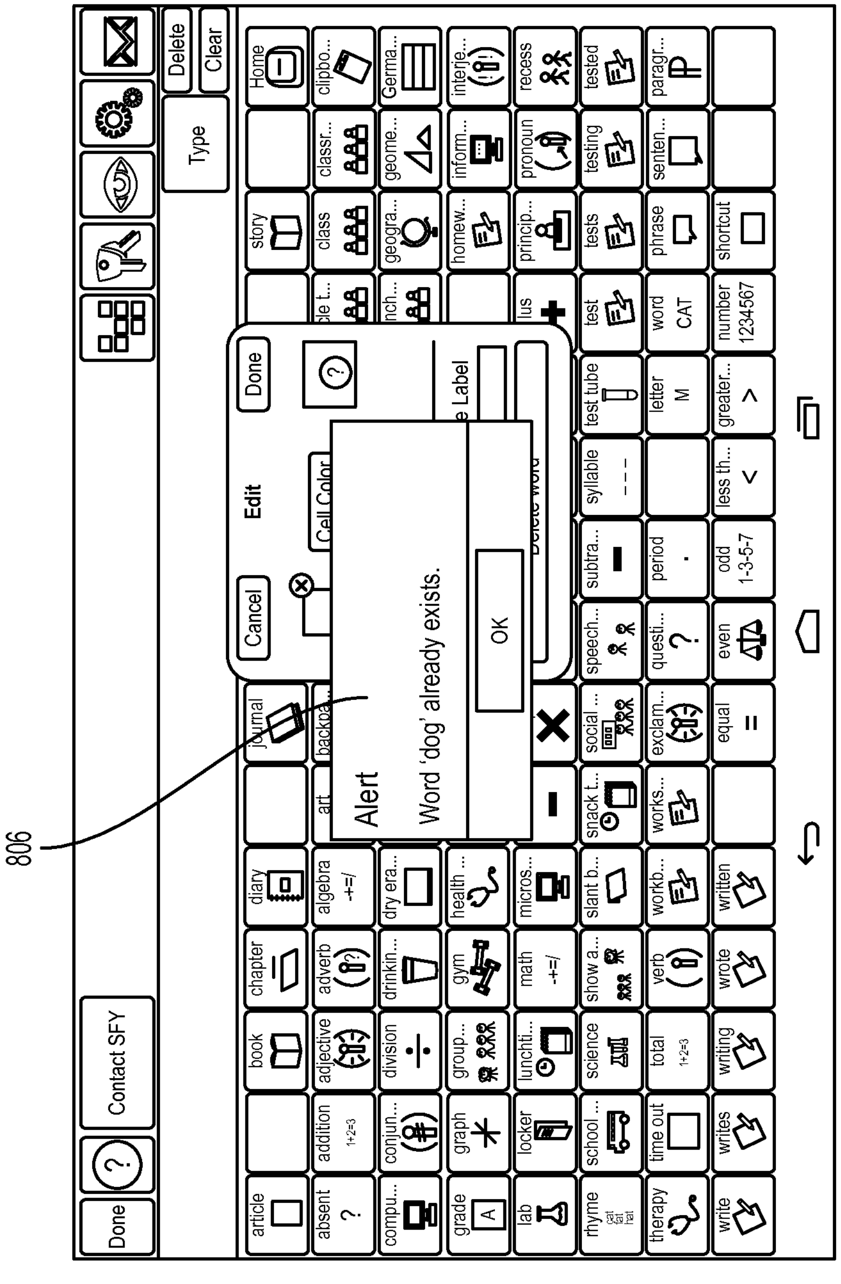

When the administrator selects done, the language system may determine if the entered word already exists within the language system by searching the data structure for any existing instances of the word. If the word does exist, the language system may display a message such as message 806 as shown in FIG. 8D to prevent multiple occurrences of the same word appearing in multiple locations within the data structure and the language system. If the word does not exist, a key may be added to the language system showing the newly added word, and the data structure may be updated accordingly.

To delete a word, the administrator may select the edit key 103*a*, and select an existing key on any secondary screen. As shown in window 804, the administrator may have the option to delete the word.

Additional features not discussed above may be implemented in the language system as well. For example, a user may be able to send a short message system (SMS) message, email message, or other text message by selecting the messaging key 103*h* from the home screen 100. The user may access a contact list associated with the device (e.g., an email contact list stored in memory associated with an email application on the device) and, using the language system, construct a text message or an email message for one or more recipients selected from the contact list by using the keys contained within the home screen and the secondary screens. Similar to constructing a sentence, the user may construct an email message or a text message to one or more recipients. Similarly, once a message is constructed by the user, the user may opt to post the message to an Internet message board, or to a social media outlet such as Facebook® or Twitter® via the integrated messaging system within the language system.

Additionally, a user or administrator may be able to alter the settings associated with the language system be selecting the settings key 103g from the home screen 100. By using this feature, the administrator may set up a new user, alter the new user's level of access, and modify other related settings. For example, as a user of the language system progresses and become more proficient with the system, the administrator may opt to provide the user with access to additional features such as the messaging system, the search function, or other similar functions.

Another additional feature may be a babble feature. The babble feature may include a level of access to all features in the language system. An administrator or teacher may provide a user of the language system with full access to the entire vocabulary contained within the language system for a set amount of time using the babble feature (e.g., five minutes). After the time is elapsed, the administrator may shut off the babble feature, returning the language system to the user's previous level of access.

Another additional feature of the language system may be additional access methods such that users with disabilities may access the language system. For example, for a user with motor deficits who may not be able to use their hands to touch the device, the language system may utilize scanning or eye gaze access. For scanning, the user may have access to a single button or selection switch to interact with the device. The language system may selectively highlight a row or column of keys, scrolling slowly through each row and/or column. In response to the user pushing the button, the language system may stop on a specific highlighted box, thereby allowing the user to select that highlighted word.

Another additional access method is eye gaze access. A camera or other image capture device associated with the language system (or the device running the language system) may scan the user to detect eye movement, and the user's eye movements are captured and interpreted by the language system, thereby providing the user with the ability to interact with the language system using their eye movements.

It should be noted that scanning and eye gaze access are shown by way of example only. Additional access methods may be incorporated into the language system accordingly, thereby enabling additional users having various disabilities to have full access to the language system.

Figure 9:
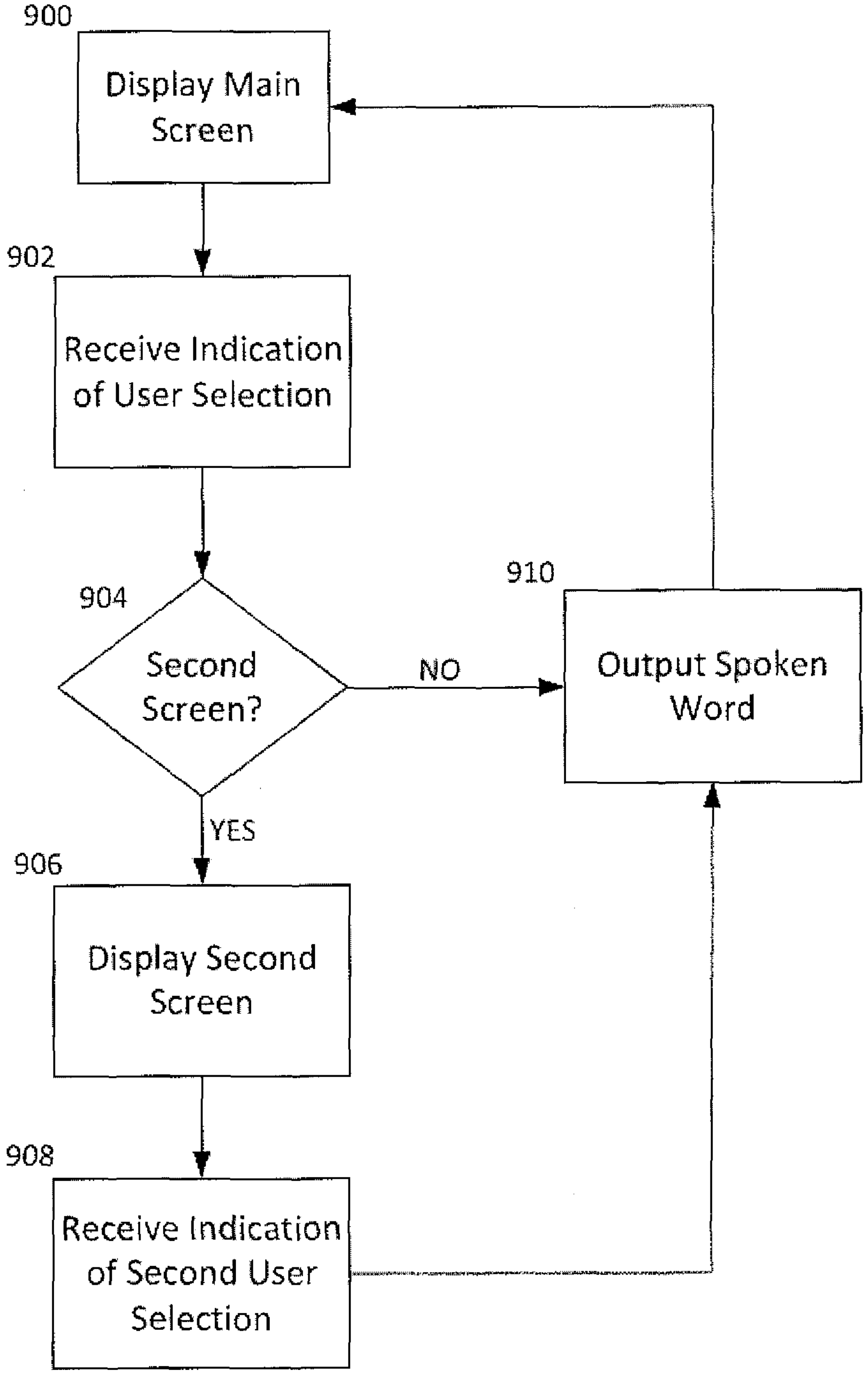
FIG. 9 depicts a flow process illustrating a sample user interaction with the AAC language system according to an embodiment.

FIG. 9 depicts an example of a process showing a sample interaction between a user and the language system as described herein. For explanatory purposes, it is assumed that the user is accessing the language system on a tablet computer. However, this is by way of example only, and the language system as described herein may be accessed on various computing devices.

Initially, the user accesses the language system on the tablet computer. For example, a teacher may turn on the tablet computer, open the language system application and select the user's name from a list of available users. Once initialized, the language system may display 900 the home screen on the tablet device. As discussed above, the home screen may include a full set of the core words, or a subset of the core words as defined by a teacher or other administrator. The user may select one of the core words from the home screen, and the language system may receive 902 an indication of the user selection. In response to the user selection, the language system may determine 904 if the user selected core word is linked to a secondary screen. If the language system determines 904 that the user selected core word is linked to a secondary screen (e.g., the "YES" path as shown in FIG. 9), the language system may display 906 the secondary screen to the user.

Like with the home screen, the user may select a word displayed on the secondary screen, and the language system may receive 908 an indication of the user's second selection. The language system may output 910 an alert related to the second selection. For example, the language system may output 910 a spoken version of the word selected by the user and return to displaying 900 the home screen.

If the language system determines 904 the user's first selection is not linked to a secondary screen (e.g., the "NO" path as shown in FIG. 9), the language system may output 910 a spoken word version of the user's first selection and return to displaying 900 the home screen.

Figure 10:
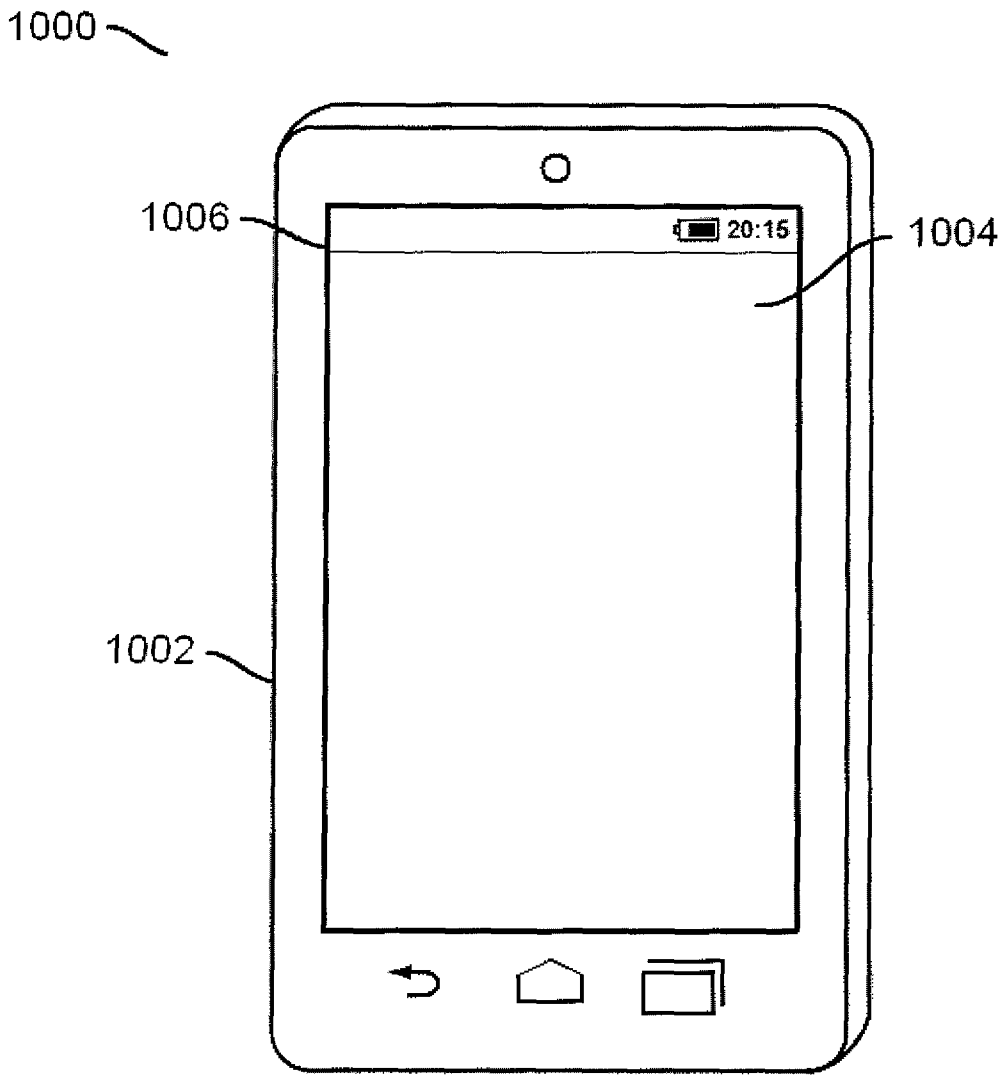
FIG. 10 depicts an example of a portable computing device.

FIG. 10 illustrates an example of a portable computing device 1000. The portable computing device 1000 includes a bezel or case 1002 for enclosing and protecting various operating components of the portable computing device. The portable computing device 1000 further includes a combination input and display component 1004. In this example, the input and display component 1004 is a touchscreen configured to both receive user input as well as display information. The input and display component 1004 includes one or more sensors configured to detect a touch input and, in response, generate one or more signals that may be acted upon by a processor. It should be noted, however, the input and display component 1004 is shown by way of example only. The mobile device may include a keypad, track-pad, track-ball, or other similar input device in combination with a display screen. The portable computing device 1000 may also include a status or notification bar 1006 for displaying information relevant to the current operation of the portable computing device, such as battery life, message indicators, connection strength indicators, and other similar information. Various other components such as one or more speakers, one or more cameras, one or more microphones, input ports, output ports, memory card slots, and other components may be integrated into the portable computing device 1000 as well.

Figure 11:
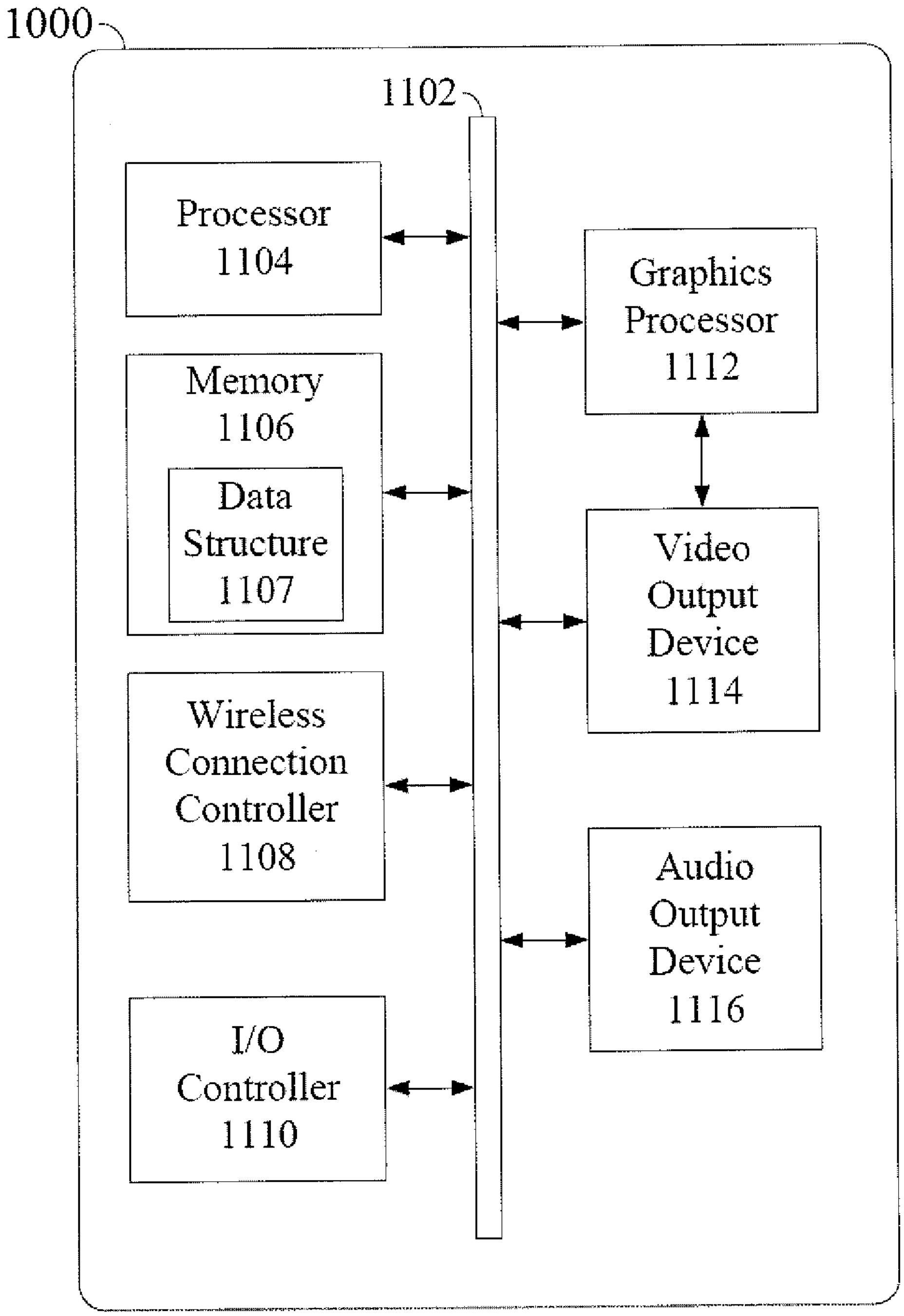
FIG. 11 depicts an example of a system diagram for a portable computing device.

FIG. 11 illustrates an example of a system diagram for the portable computing device 1000. Various internal components may be operably connected to a bus 1102. A processing device or processor 1104 may be operably connected to the bus 1102. Similarly, a tangible and non-transitory computer readable medium or memory 1106 may be operably connected to the bus 1102 and configured to store various programming instructions to be run by the processor 1104. The memory 1106 may further store content items such as applications, videos, documents, audio files and similar content for processing and display/presentation on the portable computing device 1000. In some alternative embodiments, the content items may be stored in a remote storage location such as a networked server or a cloud storage device and accessed by the portable computing device 1000 as needed.

Additionally, the memory 1106 may be configured to store the data structure 1107 for the language system. The data structure 1107 may be a database or other type of data structure configured to store organized information and provide searching and retrieval features for the information. The data structure 1107 may include an instance of each word contained within the language system, as well as information related to links between words, ontologies for each word (if applicable), related images and icons for each word, and arrangement information for positioning each word on the home screen or one of the secondary screens. Additionally, the memory 1106 may also be configured to store one or more software modules such as rule sets for defining the ontologies, a schema for determining links between related words within similar ontologies, searching and retrieving information from the data structure 1107, and other functions related to the language system A wireless connection controller 1108 may be operably connected to the bus 1102 and configured to establish one or more wireless network connections. For example, the wireless connection controller 1108 may be configured to establish a cellular telephone connection, a cellular data network connection (e.g., a 3G or 4G data connection), a wireless data network or WiFi connection (e.g., a 802.11n connection), a Bluetooth® connection, and other similar wireless connections. It should be noted that a single wireless connection controller 1108 is shown by way of example only. A portable computing device may include multiple wireless connection controllers to increase throughput across multiple networks simultaneously.

An input/output (I/O) controller 1110 may be operably connected to the bus 1102 and configured to control various input and output devices. For example, the I/O controller 1110 may be operably connected to the input and display component 1004 as shown in FIG. 9. The I/O controller 1110 may also be operably connected to a graphics processor 1112, a video-output device 1114 and an audio output device 1116 via the bus 1102, and configured displaying and/or presenting various images, videos, audio files, and other content to a user of the portable computing device 1000 via an output device such as the input and display component 1004.

It should be noted the architecture and arrangement of components as shown in FIGS. 9 and 10 are shown by way of example only to illustrate an exemplary portable computing device. Depending on the design, construction and intended purpose of the portable computing device, the type and arrangement of components may be altered. For example, if the portable computing device is a smartphone, additional components related to capturing a user's voice, converting the voice to a digital signal, and transmitting and receiving digitized voice information would be included.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of providing an augmentative and alternative communication (AAC) language system, the method comprising:

displaying, by a processing device on a display, a home screen, the home screen comprising a first plurality of user selectable communication keys, wherein each communication key represents a first word;

receiving, by the processing device, a first indication of a user selection of a first key from the first plurality of user selectable keys, wherein the first key is located at a first position on the display;

in response to receiving the first indication, determining, by the processing device, whether the first key is linked to a secondary screen;

if the first key is not linked to a secondary screen, outputting an audible signal representing the first word; and if the first key is linked to a secondary screen, displaying the secondary screen, the secondary screen comprising a second plurality of communication keys that are related to the first word, wherein the secondary screen further comprises a communication key that represents the first word, wherein:

displaying the secondary screen comprises displaying the second plurality of communication keys that are related to the first word so that the second plurality of communication keys comprise words that are semantically related to the first word as different tenses, conjugations or forms of the first word, and displaying the second plurality of communication keys also comprises displaying the words that are semantically related to the first word on keys that are adjacent to the key containing the first word;

wherein the AAC language system is configured so that each key of the secondary screen is configured to output an audible output signal corresponding to a word associated with the key of the secondary screen and the AAC language system audibly outputs each user selected word after no more than two user selections.

2. The method of claim 1, wherein the communication key on the secondary page that represents the first word is in the first position.

3. The method of claim 1, further comprising receiving, by the processing device, a second indication of a user selection of a second key displayed on the secondary screen.

4. The method of claim 3, further comprising:

in response to receiving the second indication, outputting an audible signal representing a word that is represented by the second key to a user of language system; and displaying, by the processing device on the display, the home screen.

5. The method of claim 1, wherein the first plurality of user selectable keys are each labeled with a core word.

6. The method of claim 1, wherein the second plurality of communication keys that are part of an ontology that is related to the first word.

7. The method of claim 6, wherein the ontology related to the first word comprises at least one of synonyms of the first word, superlative groups related to the first word, or words that are likely to accompany the first word in a sentence.

8. The method of claim 7, wherein keys representing a superlative group are arranged in a size order.

9. The method of claim 1, wherein the first key comprises an image related to the first word.

10. The method of claim 9, wherein the communication key representing the first word displayed on the secondary screen does not include the image related to the first word.

11. The method of claim 1, wherein displaying the secondary screen also comprises displaying the second plurality of communication keys that are related to the first word so that the second plurality of communication keys also comprise words so that when a second key is selected in the second screen, the word of the second key follows the first word in a sentence.

12. A device for providing an augmentative and alternative communication (AAC) language system, the device comprising:

a processor;

a touch-sensitive display operably connected to the processor; and a computer readable medium operably connected to the processor, the computer readable medium containing a set of instructions configured to instruct the processor to perform the following:

display a home screen on the touch-sensitive display, the home screen comprising a first plurality of user selectable communication keys, wherein each communication key represents a first word, receive, from the touch-sensitive display, a first indication of a user selection of a first key selected from the first plurality of user selectable communication keys, wherein the first key is located in a first position on the display, in response to receiving the first indication, determine whether the first key is linked to a secondary screen, if the first key is not linked to a secondary screen, output an audible signal representing the first word, and if the first key is linked to a secondary screen, display the secondary screen on the touch-sensitive display, the secondary screen comprising a second plurality of communication keys that are related to the first word, wherein:

displaying the secondary screen comprises displaying the second plurality of communication keys that are related to the first word so that the second plurality of communication keys comprise words that are semantically related to the first word as different tenses, conjugations or forms of the first word, and displaying the second plurality of communication keys also comprises displaying the words that are semantically related to the first word on keys that are adjacent to the key containing the first word;

wherein the AAC language system is configured so that each key of the secondary screen is configured to output an audible output signal corresponding to a word associated with the key of the secondary screen and the AAC language system will therefore audibly output each user selected word after no more than two user selections.

13. The device of claim 12, wherein the communication key on the secondary page that represents the first word is in the first position.

14. The device of claim 12, further comprising instructions configured to instruct the processor to receive, from the touch-sensitive display, a second indication of a user selection of a second key displayed on the secondary screen.

15. The device of claim 14, further comprising instructions configured to instruct the processor to:

in response to receiving the second indication, output an audible signal representing a word that is represented by the second key to a user of language system; and display the home screen on the touch-sensitive display.

16. The device of claim 12, wherein the first plurality of user selectable keys are each labeled with a core word.

17. The device of claim 12, wherein the second plurality of communication keys that are part of an ontology that is related to the first word.

18. The device of claim 17, wherein the ontology related to the first word comprises at least one of synonyms of the first word, superlative groups related to the first word, or words that are likely to accompany the first word in a sentence.

19. The device of claim 18, wherein keys representing a superlative group are arranged in a size order.

20. The device of claim 12, wherein the first key comprises an image related to the first word.

21. The device of claim 20, wherein the communication key representing the first word displayed on the secondary screen does not include the image related to the first word.

22. The device of claim 12, wherein the instructions to display the secondary screen also comprise instructions to display the second plurality of communication keys that are related to the first word so that the second plurality of communication keys also comprise words so that when a second key is selected in the second screen, the word of the second key follows the first word in a sentence.

* * * * *